US010103433B2

(12) United States Patent
DiNallo et al.

(10) Patent No.: US 10,103,433 B2
(45) Date of Patent: Oct. 16, 2018

(54) PHASED ARRAY ANTENNA WITH IMPROVED GAIN AT HIGH ZENITH ANGLES

(71) Applicant: Maxtena, Inc., Rockville, MD (US)

(72) Inventors: Carlo DiNallo, San Carlos, CA (US); Nathan Cummings, Gathersburg, MD (US); Stanislav Licul, Washington, DC (US); Simone Paulotto, Rockville, MD (US)

(73) Assignee: Maxtena, Inc., Rockville, MD (US)

( * ) Notice: Subject to any disclaimer, the term of this patent is extended or adjusted under 35 U.S.C. 154(b) by 259 days.

(21) Appl. No.: 15/134,444

(22) Filed: Apr. 21, 2016

(65) Prior Publication Data

US 2017/0214135 A1 Jul. 27, 2017

Related U.S. Application Data

(60) Provisional application No. 62/152,086, filed on Apr. 24, 2015.

(51) Int. Cl.

| | |
|---|---|
| ***H04B 7/185*** | (2006.01) |
| ***H01Q 3/00*** | (2006.01) |
| ***H01Q 3/36*** | (2006.01) |
| ***H01Q 1/28*** | (2006.01) |
| ***H01Q 3/26*** | (2006.01) |
| ***H01Q 11/08*** | (2006.01) |
| ***H01Q 3/28*** | (2006.01) |

(52) U.S. Cl.
CPC ............... *H01Q 3/36* (2013.01); *H01Q 1/288* (2013.01); *H01Q 3/2658* (2013.01); *H01Q 3/28* (2013.01); *H01Q 11/08* (2013.01)

(58) Field of Classification Search
CPC ................................ H01Q 1/288; H01Q 1/36
USPC .......... 342/81, 154, 354, 368, 373; 343/767, 343/895
See application file for complete search history.

(56) References Cited

U.S. PATENT DOCUMENTS 6,002,377 A * 12/1999 Huynh .................. H01Q 1/242 343/702
7,388,559 B1 6/2008 Kim
8,314,750 B1 * 11/2012 Josypenko ............ H01Q 11/08 343/767

(Continued)

FOREIGN PATENT DOCUMENTS

EP 3089264 A1 4/2016
WO WO9742682 A2 11/1997
WO WO0019563 A1 4/2000

OTHER PUBLICATIONS

Search Report dated Sep. 16, 2017 in corresponding EP3089264.

*Primary Examiner* — Dao L Phan
(74) *Attorney, Agent, or Firm* — Patents and Licensing LLC; Daniel W Juffernbruch

(57) ABSTRACT

A phased array antenna for an earth terminal for a low earth orbit satellite communication system. The phased array antenna includes a set of Quadrafilar Helical Antenna's (QHAs) elements that produce a peak directivity far off-axis which partially compensates for the angular dependence of satellite systems gain which peaks at relatively lower angle. To attain the desired angular dependence of the gain and operability at high zenith angles, the QHAs are preferably spaced apart by a distance between 0.4λ and 0.45λ, includes filaments that have a helical pitch angle α of between 62° and 84°.

11 Claims, 10 Drawing Sheets

(56) References Cited

U.S. PATENT DOCUMENTS

| | | | | |
|---|---|---|---|---|
| 9,666,948 | B1 * | 5/2017 | Rao | H01Q 11/08 |
| 2003/0206143 | A1 | 11/2003 | Goldstein | |
| 2005/0162334 | A1 * | 7/2005 | Saunders | H01Q 1/242<br>343/895 |

* cited by examiner

200

300

400

500

PHASED ARRAY ANTENNA WITH IMPROVED GAIN AT HIGH ZENITH ANGLES

RELATED APPLICATION DATA

The present patent application is based on provisional patent application 62/152,086 filed Apr. 24, 2015.

FIELD OF THE INVENTION

The present invention relates generally to antennas for use in earth terminals of satellite communication systems.

BACKGROUND

In populated areas of developed parts of the world access to communication networks is readily available. Communication networks that are available include cellular data and telephony networks, broadband cable and fiber optic networks, for example. However outside of populated areas of the developed world terrestrial communication networks may be absent. For these areas, satellite communication networks provide a valuable means of communication. For example, satellite communication networks may be used by scientists and engineers engaged in field work or by military units. Additionally there are machine-to-machine applications in which machinery located at remote sites can be provided with satellite connectivity so that the operation of the machinery can be automatically reported to a central operations site.

Satellite communication systems can be classified by the distance of their satellites' orbit from earth, which are put into three categories geosynchronous (35,786 km from the earth surface), Medium Earth Orbit (MEO, above 2000 km but below 35,786 km), and Low Earth Orbit (LEO, above 160 km but below 2000 km). Satellite systems with LEO satellites offer the advantage that the transmit power required to achieve a given bit rate is lower than it would be for geosynchronous and MEO satellites.

A directional antenna because of its higher gain has the potential to increase the achievable bit rate because it improves the link budget. However an issue with LEO satellites is that they relatively rapidly traverse from horizon to horizon and therefore a directional antenna would need to be constantly changing pointing direction while in operation. A mechanical tracking system would need to be relatively expensively made to handle the constant satellite tracking for the expected lifetime of the antenna which might be 10,000 hours.

Another issue with LEO communication systems is that the distance to the satellite varies significantly as it traverses from horizon to horizon and therefore the signal spreading losses also vary significantly, being much higher when the satellite is located closer to the horizon at high zenith (co-latitude) angles relative to the earth station. Certain LEO communication satellite systems partly compensate for this by aiming the maxima of their gain patterns at a high zenith angle, however the compensation is only partial.

What is needed is an antenna for LEO satellite communication systems that exhibits high gain, particularly at high zenith angles, and is able to track LEO satellites.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
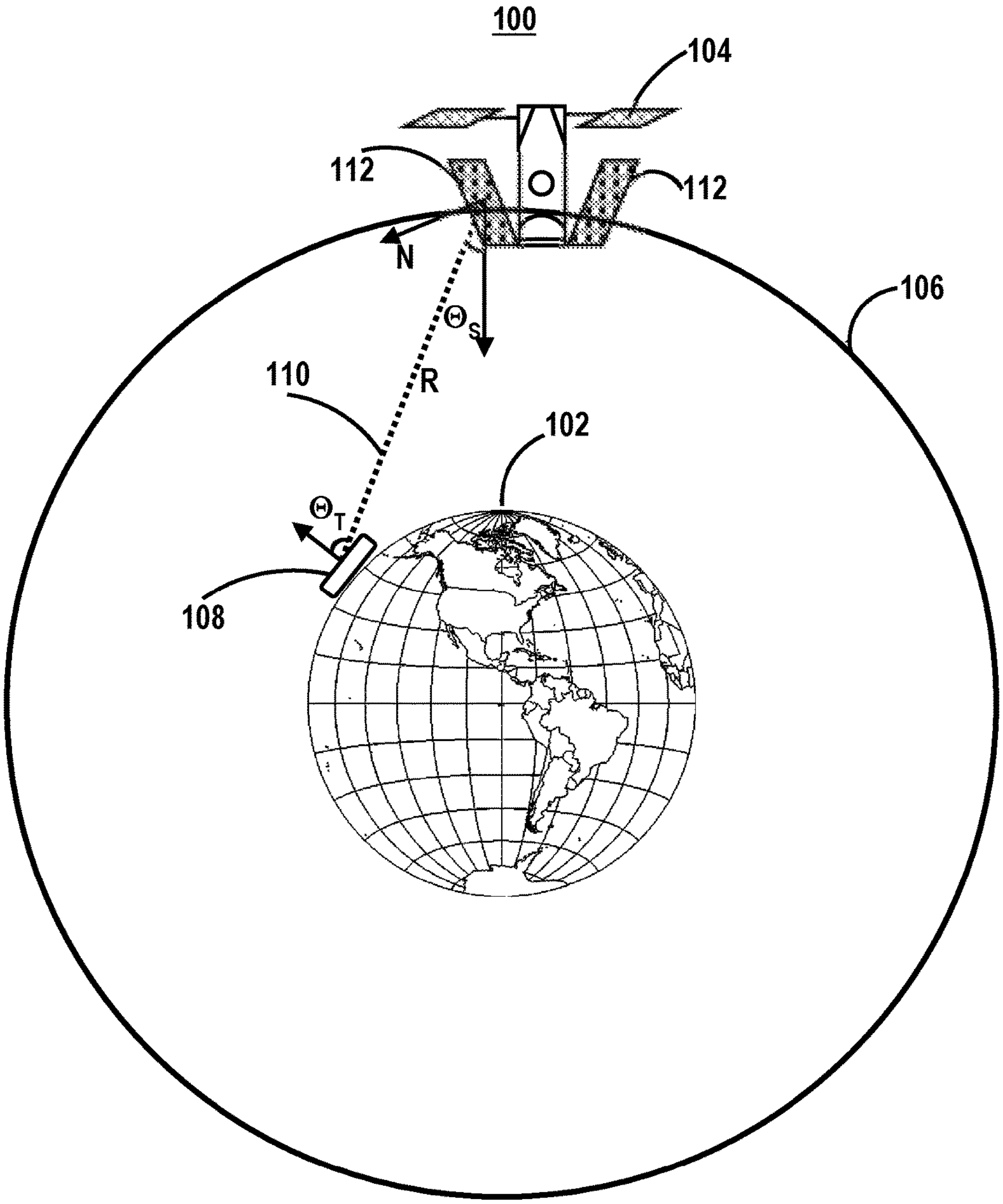
FIG. 1 is a schematic representation of a satellite communication system according to an embodiment of the invention.

Before describing in detail embodiments that are in accordance with the present invention, it should be observed that the embodiments reside primarily in combinations of method steps and apparatus components related to satellite communication earth terminal antennas. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

FIG. 1 is a schematic representation of a satellite communication system 100 according to an embodiment of the invention. The schematic includes a depiction of the earth 102. A satellite 104 is shown in an orbit 106 around the earth 102. A communication terminal 108 ("earth terminal") that is equipped with an antenna as will be describe, is located on the surface of the earth 102 and is used to establish a radio communication link 110 schematically represented by a line in FIG. 1. One-over-R-squared ($1/R^2$) loss in signal strength ("spreading loss") occurs as signals traverse the communication link 110. The zenith angle $\theta_T$ of the direction from the earth terminal to the satellite 104 is shown. The zenith angle $\theta_T$ is measured with respect to the local up direction at the earth terminal 108. The zenith angle $\theta_S$ of the direction from the satellite 104 to the earth terminal 108 is also shown. The zenith angle $\theta_S$ is measured relative to the local down direction at the satellite 104. The satellite 104 includes multiple antenna panels 112. Note that the antenna panels 112 do not face down rather they are oriented at an angle of about 60° from the downward direction at the satellite 104. This is meant to partly compensate for variations in the $1/R^2$ losses as will be described further below.

Figure 2:
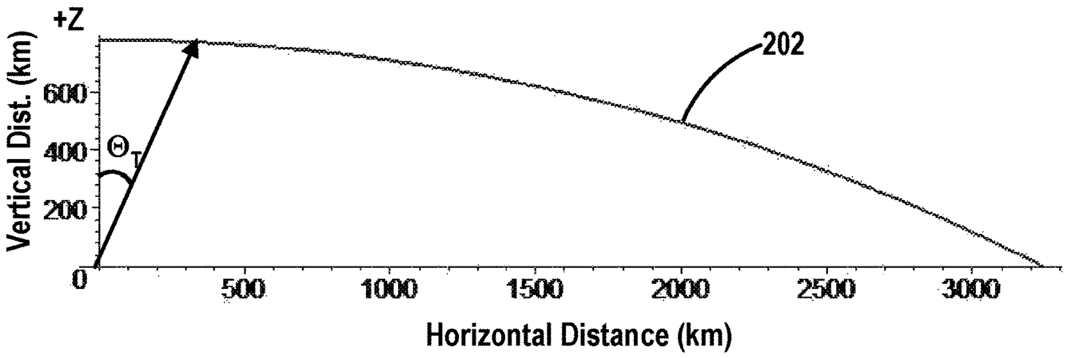
FIG. 2 is a graph including a plot of a satellite's orbit as an example to illustrate the invention.

FIG. 2 is a graph 200 including a plot 202 of a satellite's (e.g., 104) orbit as an example to illustrate the invention. The abscissa measures horizontal distance in kilometers and the ordinate measures vertical distance in kilometers. The graph 200 corresponds to a Cartesian coordinate system with its origin at the earth terminal 108. The plot is for a satellite orbiting at an altitude of 780 kilometers. According to certain embodiments of the disclosed subject matter include satellites at an orbital altitude between 663 km and 897 km. The ordinate of the graph 200 also corresponds to the local upward +Z axis relative to which the zenith angle $\theta_T$ is measured. In general, for a circular satellite orbit, the distance from communication terminal 108 on the earth's surface to the satellite is expressed in terms of the zenith angle $\theta_T$ by equation 1 below.

$$Rsph = -\cos(\theta_T)Rearth + \sqrt{\cos(\theta_T)^2 Rearth^2 + 2\cdot Rearth\cdot \text{Altitude} + Altitude^2} \quad \text{EQU. 1}$$

where, Rsph is the aforementioned distance and is the radial coordinate of the satellite in a spherical coordinate system centered at the location of the earth terminal;

Rearth is the radius of the earth, i.e., 6371 kilometer;

Altitude is the altitude of the satellite above the earth surface; and $\theta_T$ is defined above.

The plot 202 shown in FIG. 2 is given by equation 1. As the satellite 104 traverses its orbit the zenith angle $\theta_T$ varies and when the satellite position is at a high zenith angle $\theta_T$ from the perspective of the earth terminal 108 its distance is large, leading to large $1/R^2$ losses. For an arbitrary location where the earth terminal 108 might be located, there is only as small probability that a satellite that is within view will pass directly overhead. However, for any given location of the satellite within view one can draw a plane that passes through three points: the center of the earth, the earth terminal location and the satellite location. If the satellites orbit will not pass directly overhead then its velocity will not be in the plane. Nonetheless the distance to the satellite as function of the zenith angle $\theta_T$ from the earth terminal will follow the relation given by equation 1.

Figure 3:
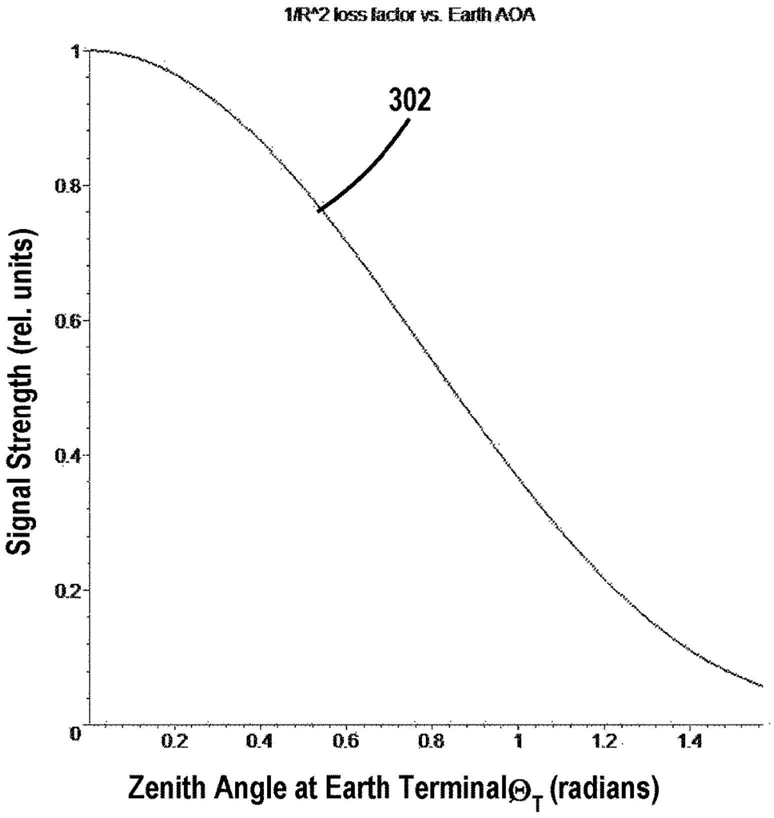
FIG. 3 is a graph including a plot of the $1/R^2$ signal strength loss versus zenith angle measured at the earth terminal for the orbit shown in FIG. 2.

FIG. 3 is a graph 300 including a plot 302 of the $1/R^2$ signal strength loss versus zenith angle $\theta_T$ measured at the earth terminal 108 for the same orbit altitude of 780 km. The abscissa measures the zenith angle $\theta_T$ at the earth terminal 108 in radians and ordinate measures the signal strength in relative units normalized to a maximum value of 1.0. The signal has its maximum at $\theta_T$=0° and minimum at $\theta_T$=90°. The $1/R^2$ losses vary by a factor of 17.3 (−12.4 dB) from the distance at zenith to the distance at the horizon ($\theta_T$=90°).

In order to endeavor to at least partially compensate for the variation in $1/R^2$ losses, the antenna panels 112 of the satellite 104 are tilted toward horizontal, so that the maximum gain of the antenna panels 112 tilts in the same direction, however as discussed further below this does not fully compensate for the above described variation in the $1/R^2$ losses.

Figure 4:
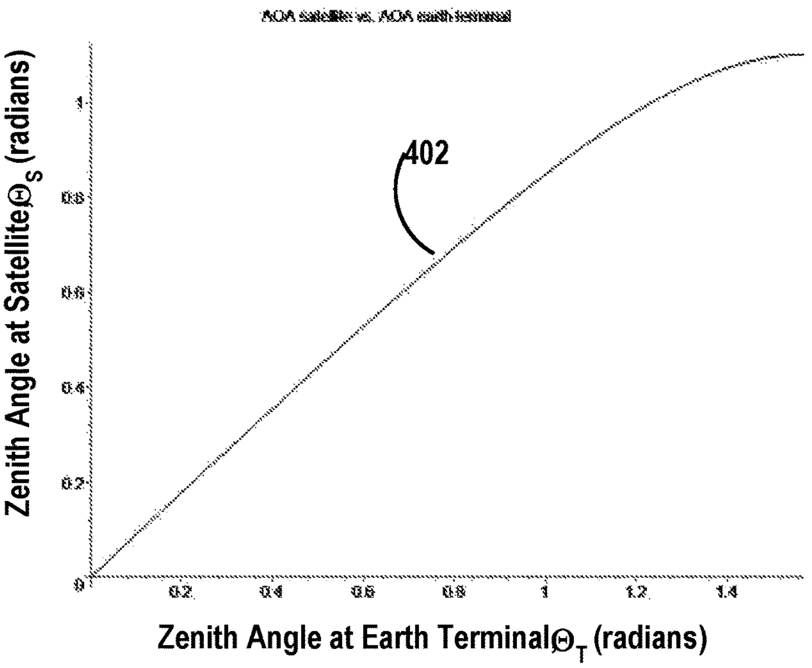
FIG. 4 is a graph including a plot of the zenith angle measured at the satellite versus the zenith angle measured at the earth terminal for the orbit shown in FIG. 2.

FIG. 4 is a graph 400 including a plot 402 of the zenith angle $\theta_S$ (see FIG. 1) measured at the satellite 104 versus the zenith angle $\theta_T$ (see FIG. 1) measured at the earth terminal 108 for the orbit altitude of 780 kilometers. Both the abscissa and the ordinate are marked in units of radians. Because the satellite is in a circular orbit, the satellite zenith $\theta_S$ describing the direction of the communication link relative to the local down direction at the satellite never goes beyond 1.1 radians 63° even when the satellite is at the horizon as view from the earth terminal and $\theta_S$ is 90°. This is due to the fact that the satellite rotates so as to keep its local down vector pointed at the center of the earth. $\theta_S$ is given by equation 2 below:

$$\theta_S = \arctan\left(\frac{1}{Rsph}\frac{\partial Rsph}{\partial \theta_T}\right) \quad \text{EQU. 2}$$

where, Rsph is given by equation 1; and $\theta_S$ and $\theta_S$ are defined above.

The explicit form of equation 2 is given by equation 3 below.

$$\theta_S = \arctan\left(\frac{\sin(\theta_T)Rearth - \dfrac{\cos(\theta_T)Rearth^2\sin(\theta_T)}{\sqrt{\cos(\theta_T)^2 Rearth^2 + 2Rearth\ \text{Altitude} + Altitude^2}}}{-\cos(\theta_T)Rearth + \sqrt{\cos(\theta_T)^2 Rearth^2 + 2Rearth\ \text{Altitude} + Altitude^2}}\right) \quad \text{EQU. 3}$$

The gain of the antenna panels 112 is maximum in the direction normal (perpendicular) to the surface of the panels 112. The normal is identified by the letter N in FIG. 1. For many types of antenna panels 112 the variation in gain as a function of angle from the normal vector is approximated by the relation:

$$G_{SAT} \propto \cos^E(\alpha) \quad \text{EQU. 4}$$

Where, $G_{SAT}$ is gain of the satellite antenna panel 112;

$\alpha$ is the angle from the normal vector N of the panel 112; and

E is an exponent between 1.2 and 1.5.

Figure 5:
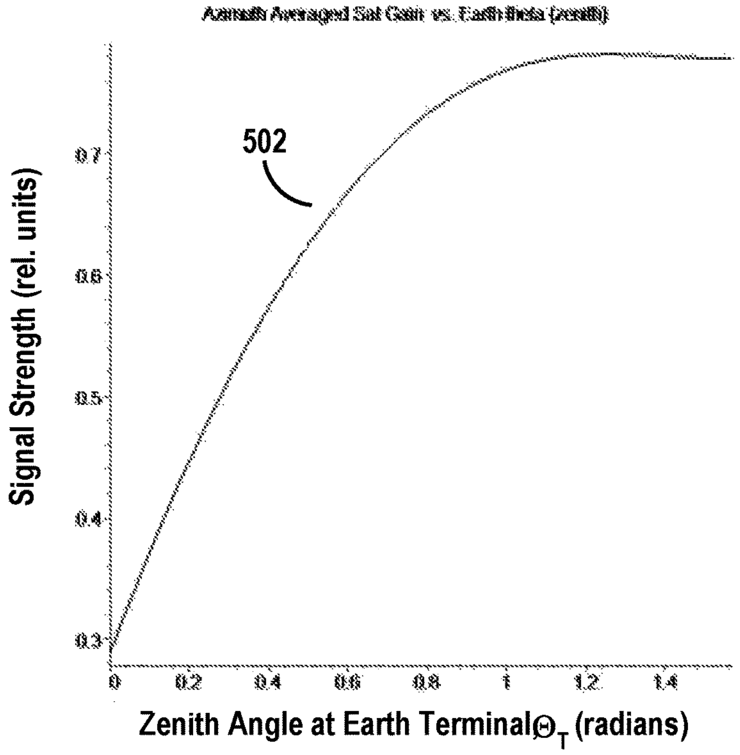
FIG. 5 is a graph including a plot of azimuth averaged satellite antenna gain versus earth terminal zenith angle.

Because the antenna panel 112 normal vector is not aligned with the local down vector at the satellite (the vector that points from the satellite to the center of the earth), the satellite antenna gain $G_{SAT}$ as a function of $\theta_S$ (as opposed to $\alpha$) varies as a function of the azimuth direction "$\phi_S$" at the satellite. Assuming for example, that the satellite 104 includes three antenna panels 112 spaced 120° apart in azimuth angle, each antenna panel will cover a 120° range of azimuth angle. For modelling purposes one can take an average over azimuth directions to obtain an average representation of variation of gain as a function of zenith angle $\theta_S$ at the satellite. Using the relation between the zenith angle at the satellite $\theta_S$ and the zenith angle $\theta_T$ at the earth terminal 108 given by EQU. 2 one can then plot the averaged satellite antenna panel 112 gain $G_{SAT}$ as a function of the zenith angle $\theta_T$ at earth terminal 108 (as opposed to as a function of $\theta_S$ which might seem more natural). FIG. 5 is a graph 500 including a plot 502 of azimuth averaged satellite antenna panel 112 gain $G_{SAT}$ versus earth terminal zenith angle $\theta_T$. This is for case that exponent E has a value of 1.2.

Figure 6:
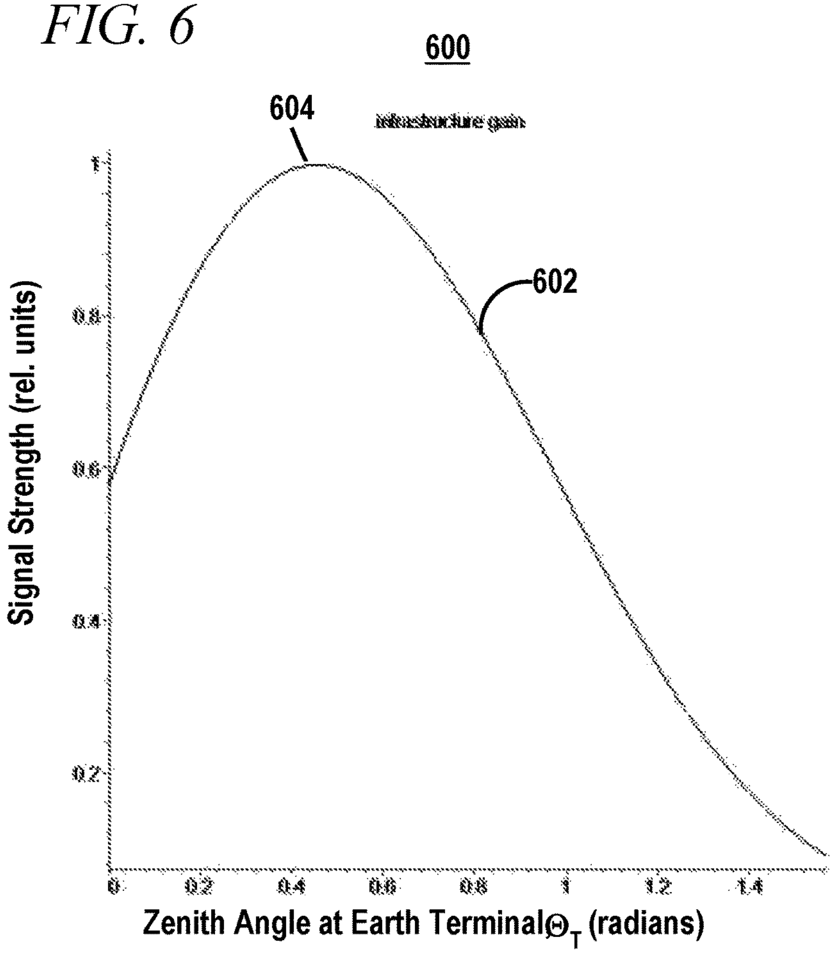
FIG. 6 is a graph including a plot of satellite communication system infrastructure gain versus earth terminal zenith angle.

The plot 502 shows that the azimuth averaged antenna gain of the satellite antenna panels 112 plot as a function of the zenith angle $\theta_T$ at earth terminal 108 is an increasing function. To understand this, it can be observed that as the satellite approaches the horizon and $\theta_T$ increases, the angle between the radio link 110 and the satellite antenna panel 112 normal vector N tends, on average, to decrease so the satellite antenna gain approaches its peak which is coincident with the normal vector N direction. However, referring again to FIG. 3 it is seen that the $1/R^2$ dependence of the signal strength strongly decreases as a function of the zenith angle $\theta_T$ at earth terminal because the satellite 104 is further away when it is at high zenith angles $\theta_T$ viewed from the earth terminal. To see how the two dependencies represented in FIG. 3 and FIG. 5 balance out, because they are both functions of $\theta_T$, we can multiply the two represented functions together. The resulting function can be referred to as the system "infrastructure gain", because it relates to the gain as a function of earth terminal zenith angle $\theta_T$ that is dependent on the communication infrastructure i.e., the design of the satellite system including the choice of satellite orbit altitude and satellite antenna panel 112 gain, but is not dependent on the design of the earth terminal 108. FIG. 6 is a graph 600 including a plot 602 of satellite communication system infrastructure gain versus earth terminal zenith angle $\theta_T$. The abscissa in FIG. 6 indicates earth terminal zenith angle $\theta_T$ in radians and the ordinate represents signal strength in relative units. From FIG. 6 it is apparent that the increasing trend of the satellite antenna panel gain shown in FIG. 5 is insufficient to overcome the decreasing gain trend due to the $1/R^2$ losses shown in FIG. 3. As a result the infrastructure gain at high zenith angles $\theta_T$ at the earth terminal drops to unacceptably low levels.

Figure 7:
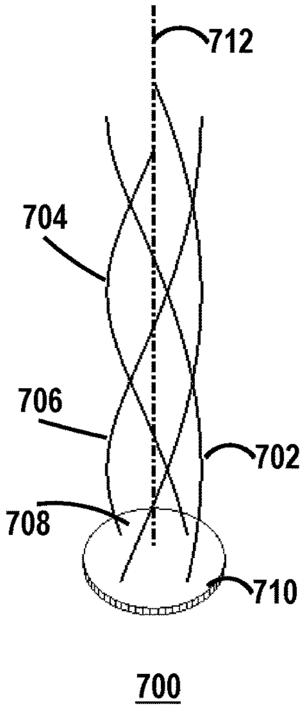
FIG. 7 is front view of a quadrifilar helical antenna (QHA) for use in an earth terminal phased array antenna according to an embodiment of the invention.

FIG. 7 is front view of a quadrifilar helical antenna (QHA) 700 for use in an earth terminal 108 phased array antenna 800 (FIG. 8) according to an embodiment of the invention. The QHA is designed to address the weakness of the infrastructure gain shown in FIG. 6 at high zenith angles $1/R^2$. The QHA includes a set of four helical filaments including a first helical filament (conductor) 702, a second helical filament 704, a third helical filament 706 and a fourth helical filament 708 connected to a printed circuit board 710. The helical filaments 702, 704, 706, 708 wind about a virtual central axis 712 of the QHA. The QHA 700 is designed to produce a gain pattern that has a peak gain at a zenith angle $\theta_T$ displaced from 0° and preferably at a zenith angle $\theta_T$ that is greater than the zenith angle $\theta_T$ at which the infrastructure gain achieves its peak. In this way the gain curve of the QHA at least partly compensates for the drop off of infrastructure gain beyond its own peak. According to certain embodiments the QHA produces a peak gain at an angle above 0.6 radians (≈34.4°) and more preferably produces a peak gain at an angle above 0.8 radians (≈45.8°). According to certain embodiments, to achieve the foregoing objectives related to the form of the gain pattern, each of the helical filaments 702, 704, 706, 708 completes between 0.5 and 0.75 turns around the virtual central axis 712 of the QHA 700 and each of the helical filaments 702, 704, 706, 708 has a length between 0.7λ and 0.8λ, λ being the wavelength corresponding to the center frequency of operation of the QHA 700. Furthermore, to achieve the foregoing objectives, according to certain embodiments a virtual cylindrical surface on which the helical filaments 702, 704, 706, 708 are positioned has a diameter between 12.92 mm and 17.48 mm (for example 15.2 mm according to an exemplary embodiment) and the helical filaments 702, 704, 706, 708 are characterized by a helical pitch angle of between 62° and 84° (for example 73.3° according to an exemplary embodiment) Additional design aspects involved in the forgoing objectives related to form of the gain pattern have to do with the design of the array shown in FIG. 8 and discussed below.

The helical filaments 702, 704, 706, 708 can be formed on a piece of flexible printed circuit material that when rolled into a cylinder makes the helical filaments 702, 704, 706, 708 adapt their helical shape. Alternatively the helical filaments 702, 704, 706, 708 can take the form of metallization on the surface of a dielectric, e.g., ceramic cylinder. A benefit of forming the helical elements 702, 704, 706, 708 on a ceramic cylinder is that it allows the size of the QHA to be reduced. On the other hand a benefit of using a flexible printed circuit board rolled into a cylinder (with the space in the cylinder occupied by air) is that certain signal energy losses ascribed to the use of ceramic cylinder are avoided. Note that when used in the array 800 shown in FIG. 8 the helical filaments 702, 704, 706, 708 along with those forming additional QHA's may be supported on a larger printed circuit board.

Figure 8:
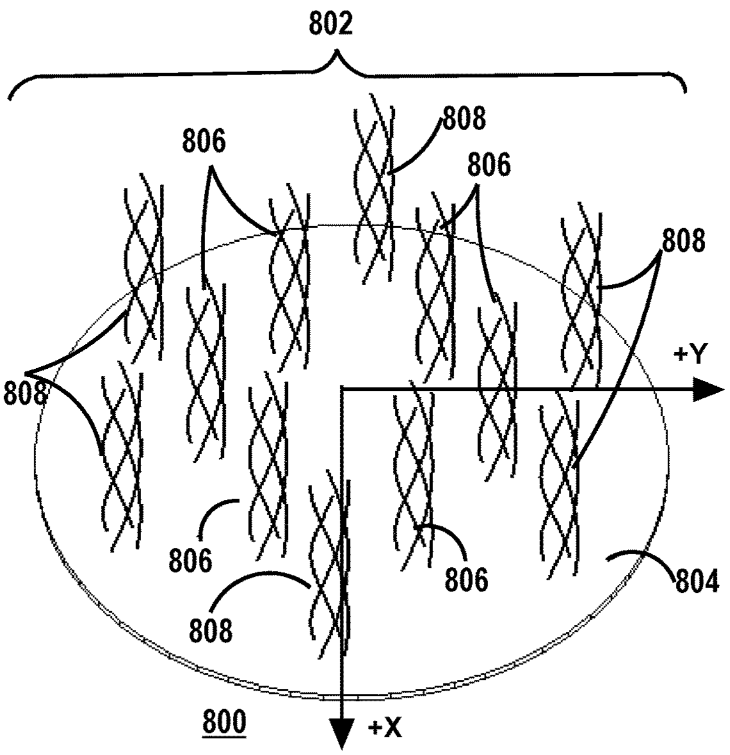
FIG. 8 is a perspective view of an earth terminal phased array antenna that includes 12 of the QHAs shown in FIG. 7 according to an embodiment of the invention.

FIG. 8 is a perspective view of a phased array antenna 800 for the earth terminal 108 according to an embodiment of the invention. The phased array antenna 800 includes a set 802 of 12 of the QHAs 700 shown in FIG. 7. The set of QHAs 802 are arranged in two concentric hexagonal rings, including an inner hexagonal ring of six QHAs 806 and an outer hexagonal ring of six QHAs 808 supported on a printed circuit board 804. Thus in each of the hexagonal rings the QHAs are spaced by 60° in azimuth angle. There is a 30° azimuth angle offset between the QHAs in the two rings. All of the QHAs in phased array antenna 800 are spaced from each other by a common distance which is preferably selected to be between 0.4λ and 0.45λ, λ being the free space wavelength corresponding to the center frequency of operation of the phased array antenna 800. +X and +Y Cartesian axes are shown superimposed on the phased array antenna 800. The +X and the +Y axes are in the plane of the printed circuit board 804. The +Z axes relative to which the zenith angle $\theta_T$ is measured is not shown in FIG. 8 but extends upward perpendicular to the +X and +Y axes and perpendicular to the printed circuit board 804, forming a right-handed Cartesian coordinate system with the +X and +Y axes. The concentric hexagonal rings 806, 808 with the relative 30° azimuth angle offset allows the phased array antenna 800 to be pointed to many different directions well distributed over the 2π steradian upward facing hemisphere (see FIG. 10) while using a digitally controllable phase shift network (see FIGS. 13, 15) that produces phase shifts in finite increments of a minimum phase shift, e.g., π/8=22.5°. Traditionally phased array antenna elements are spaced by 0.5λ and doing so in theory allows one to apply a phase difference of 180° (=8*22.5°) between adjacent elements in order to point the phased array antenna's 800 gain pattern to a zenith angle $\theta_T$ of 90°, which in theory would be beneficial for addressing the low value of the infrastructure gain at $\theta_T$ of 90° as shown in FIG. 6, however in practice it is found that doing so causes an impedance presented by the phased array antenna 800 to a power amplifier to which it is coupled (See FIG. 11) to change so substantially that the impedance match to the phased array antenna 800 is adversely effected. To accommodate both the desire to be able steer the phased array antenna to high zenith angles grand to avoid large changes in the impedance presented by the antenna, the QHA elements 806, 808 are spaced by a distance between 0.4λ and 0.45λ as discussed above.

Table I below shows parameters that describe various beam pointing configurations and approximate resulting beam pointing angles for the phased array antenna 800.

TABLE I

| $N_X$ | $N_Y$ | Zenith, $\theta_T$ (degrees) | Azimuth, $\phi_T$ (degrees) |
|---|---|---|---|
| 0 | 0 | 0 | — |
| 0 | 2 | 9 | 270 |
| 0 | 4 | 19 | 270 |
| 0 | 6 | 29 | 270 |
| 0 | 8 | 40 | 270 |
| 0 | 10 | 53 | 270 |
| 0 | 12 | 74 | 270 |
| 1 | 1 | 9 | 210 |
| 1 | 3 | 16 | 240 |
| 1 | 5 | 25 | 251 |
| 1 | 7 | 35 | 256 |
| 1 | 9 | 47 | 259 |
| 1 | 11 | 63 | 261 |
| 2 | 0 | 16 | 180 |
| 2 | 2 | 19 | 210 |
| 2 | 4 | 25 | 229 |
| 2 | 6 | 34 | 240 |
| 2 | 8 | 44 | 247 |
| 2 | 10 | 58 | 251 |
| 3 | 1 | 25 | 191 |
| 3 | 3 | 29 | 210 |
| 3 | 5 | 35 | 224 |
| 3 | 7 | 44 | 233 |
| 3 | 9 | 56 | 240 |
| 3 | 11 | 77 | 245 |
| 4 | 0 | 34 | 180 |
| 4 | 2 | 35 | 196 |
| 4 | 4 | 40 | 210 |
| 4 | 6 | 47 | 221 |
| 4 | 8 | 58 | 229 |
| 4 | 10 | 77 | 235 |
| 5 | 1 | 44 | 187 |
| 5 | 3 | 47 | 199 |
| 5 | 5 | 53 | 210 |
| 5 | 7 | 63 | 219 |
| 6 | 0 | 56 | 180 |
| 6 | 2 | 58 | 191 |
| 6 | 4 | 63 | 201 |
| 6 | 6 | 74 | 210 |
| 7 | 1 | 77 | 185 |

Table I is based on the assumption that the spacing between elements was 0.45λ. The first two columns show parameters $N_X$, $N_Y$ which respectively specify X and Y components of the wave vector of the beams produced by the phased array antenna 800 according to equations 5 and 6 below.

$$WV_X = -\frac{\left(\frac{1}{2}\delta \cdot N_X\right)}{(\cos(60°) \cdot D)} \quad \text{EQU. 5}$$

$$WV_Y = -\frac{\left(\frac{1}{2}\delta \cdot N_X\right)}{(\sin(60°) \cdot D)} \quad \text{EQU. 6}$$

Where, $N_X$, $N_Y$ are the parameters from Table I,

δ is the minimum phase shift of which the phase shifter (FIG. 15) is capable (e.g., π/8=22.5°, see FIG. 15); and D is the element spacing (e.g., 0.45λ).

Figure 9:
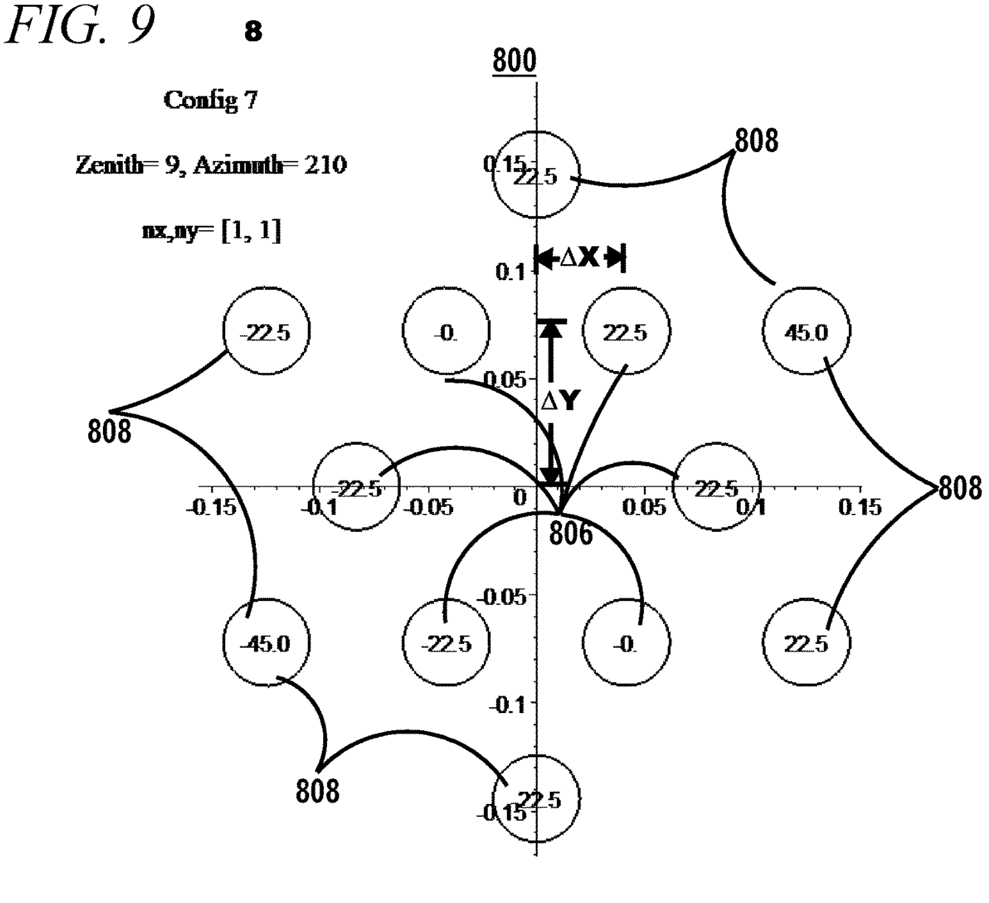
FIG. 9 is a plan view of the phased array antenna shown in FIG. 8 along with phasing information for one configuration.

Note that cos(60°) times D gives the spacing of elements in the X direction, labeled ΔX in FIG. 9, and sin(60°) times D gives the spacing of elements in the Y direction labeled ΔY in FIG. 9. Note also that the sum of Nx and Ny is always even so that phase applied to each QHA is always a multiple of δ. Note also that the factor of ½ in the numerators of EQU. 5 and EQU. 6 allows the value of δ applied to a QHA to result from a combination of $WV_X$ and $WV_Y$, for example in the configuration shown in the $8^{TH}$ row of Table I which is illustrated in FIG. 9. FIG. 9 is a plan view of the phased array antenna 800 shown in FIG. 8 along with phases applied to each element for the $8^{TH}$ configuration. Note that FIG. 9 appears to be the X-Y plane of a left hand coordinate system but can be reconciled with FIG. 9 if it assumed that FIG. 9 is a bottom view of the X-Y plane. In FIG. 8 the phase applied to each QHA element is marked within the element. The phase to be applied to each element is simply the dot product of the wave vector WV and a vector from the center of the phased array antenna 800 (the coordinate system origin) to the element in question. Because the feed to each QHA is at the X-Y plane only the $WV_X$ and $WV_Y$ components need be considered in the dot product, so it is a 2-D dot product. The dot product expression of the phases for each QHA is given by equation 7 below.

$$\text{Phase}_i = X_i \cdot WV_X + Y_i \cdot WV_Y \quad \text{EQU. 7}$$

where, $\text{Phase}_i$ is the phase to be applied to the $i^{TH}$ QHA in the array;

$X_i$ and $Y_i$ are the coordinates of the $i^{TH}$ QHA; and $WV_X$ and $WV_Y$ are given equations 5 and 6.

The zenith and azimuth angles of the pointing direction, and the Nx and Ny values are also shown at the upper left of FIG. 9.

Note that $WV_Z$ can be calculated once $WV_X$ and $WV_Y$ are given by equations 5 and 6 using the fact that the Euclidean sum of $WV_X$, $WV_Y$ and $WV_Z$ adds up to the magnitude of the wave vector WV=2π/λ. The zenith angle is then give by equation 7 and the azimuth angle, based only on $WV_X$ and $WV_Y$ is given by equation 8 below.

$$\Theta_T = \arccos\left(\frac{WV_Z}{WV}\right) \quad \text{EQU. 7}$$

$$\Phi_T = \arctan\left(\frac{WV_Y}{WV_X}\right) \quad \text{EQU. 8}$$

where $\Theta_T$ is the zenith angle as discussed above and $\Phi_T$ is the azimuth angle.

Figure 10:
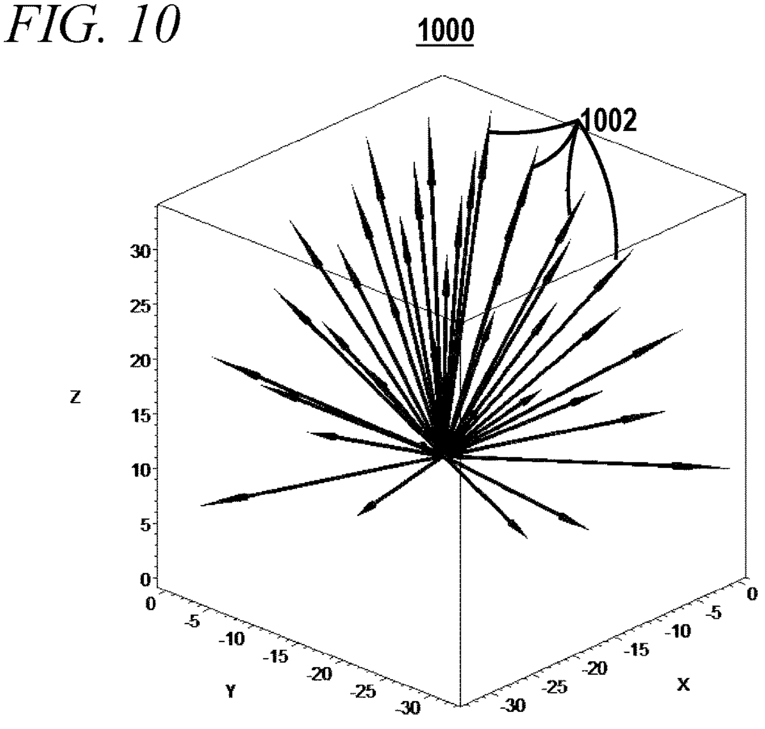
FIG. 10 is a 3-D graph including vectors indicating pointing directions in one quadrant for multiple configurations of the phased array antenna shown in FIGS. 8 and 9.

FIG. 10 is a 3-D graph 1000 including vectors 1002 (only a few of which are labeled to avoid crowding the drawing) indicating pointing directions in one quadrant for multiple configurations of the phased array antenna shown in FIGS.

8 and 9. The X, Y, Z axes give components of a wave vector having a magnitude of 34 corresponding to a wavelength of 0.185 meters. The direction vectors shown in FIG. 10 correspond to the configurations shown in Table I. Note that Table I, and FIG. 10 only show a subset of configurations for which Nx and Ny have zero or positive values, and the corresponding direction vectors are all in one quadrant with negative $WV_X$ and $WV_Y$ values. To obtain wave vectors in the remaining three quadrants, one allows Nx and Ny to take on negative values as well.

Figure 11:
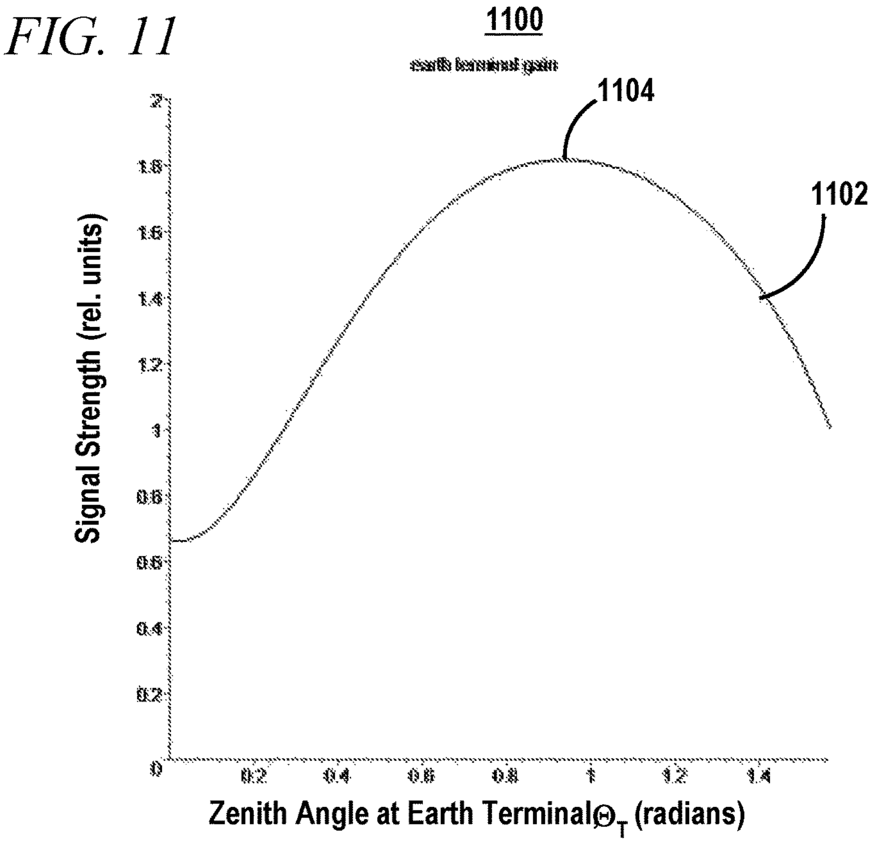
FIG. 11 is a graph including a plot of gain versus zenith angle for an antenna element of the earth terminal phased array antenna shown in FIGS. 8 and 9.

FIG. 11 is a graph 1100 including a plot 1102 of gain versus zenith angle for a QHA antenna element of the earth terminal phased array antenna shown in FIGS. 8 and 9. The abscissa in FIG. 6 indicates earth terminal zenith angle $\theta_T$ in radians and the ordinate represents signal strength in relative units. The gain has a peak 1104 at $\theta_T$=0.94 radians (53°). It is well beyond the peak 604 in the infrastructure gain shown in FIG. 6, which is at $\theta_T$=0.41 radians (23°). Accordingly, the peak in the gain of the earth terminal phased array antenna 800 tends to compensate for the precipitous drop off in the infrastructure gain 602 beyond its peak at $\theta_T$=0.41. According to certain embodiments of the invention each element of a phased array antenna of an earth terminal exhibits a peak gain at an angle above 0.785 radians (45°).

Figure 12:
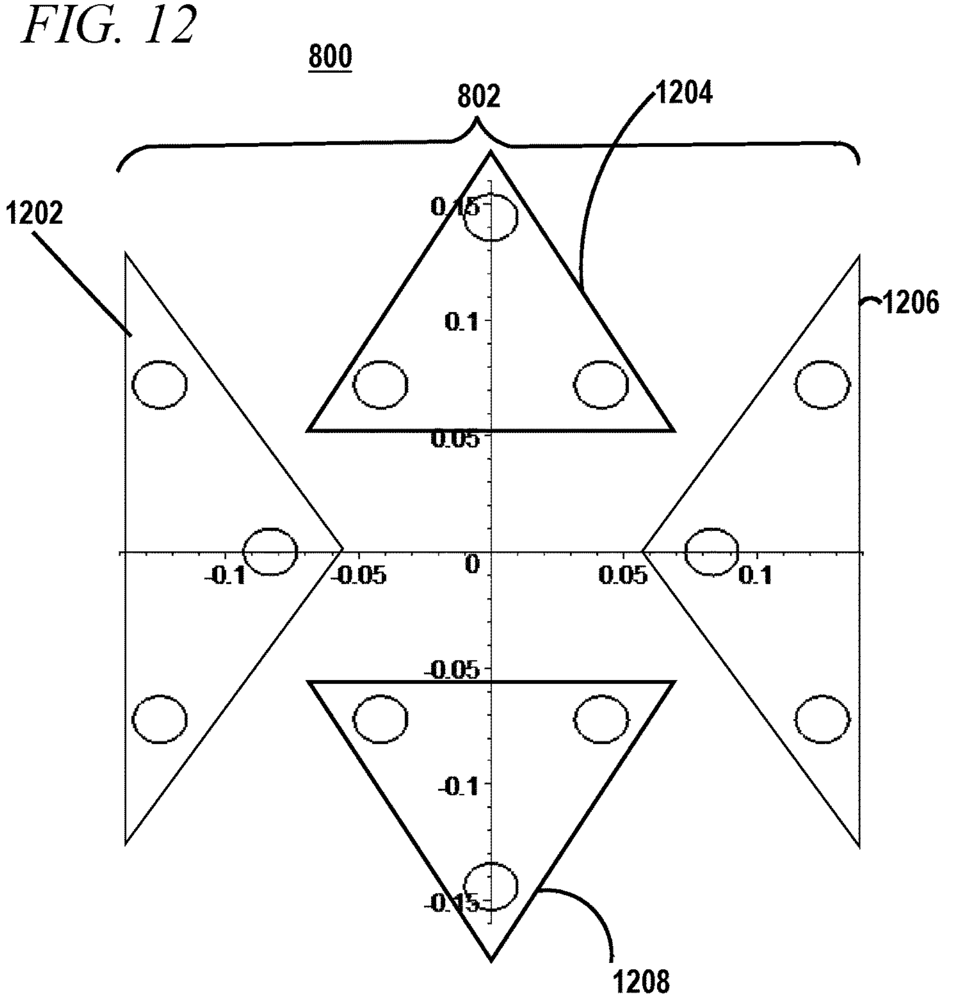
FIG. 12 is a plan view of the phased array antenna shown in FIGS. 8-9 showing how antenna elements are grouped together.

FIG. 12 is a plan view of the phased array antenna 800 shown in FIGS. 8-9 showing how antenna elements are grouped together. The QHA's 802 are grouped into four groups of three including a first group 1202, a second group 1204, a third group 1206 and a fourth group 1208. Each group can be served by essentially a duplicate of the same circuit design as shown in FIG. 13 and discussed below.

Figure 13:
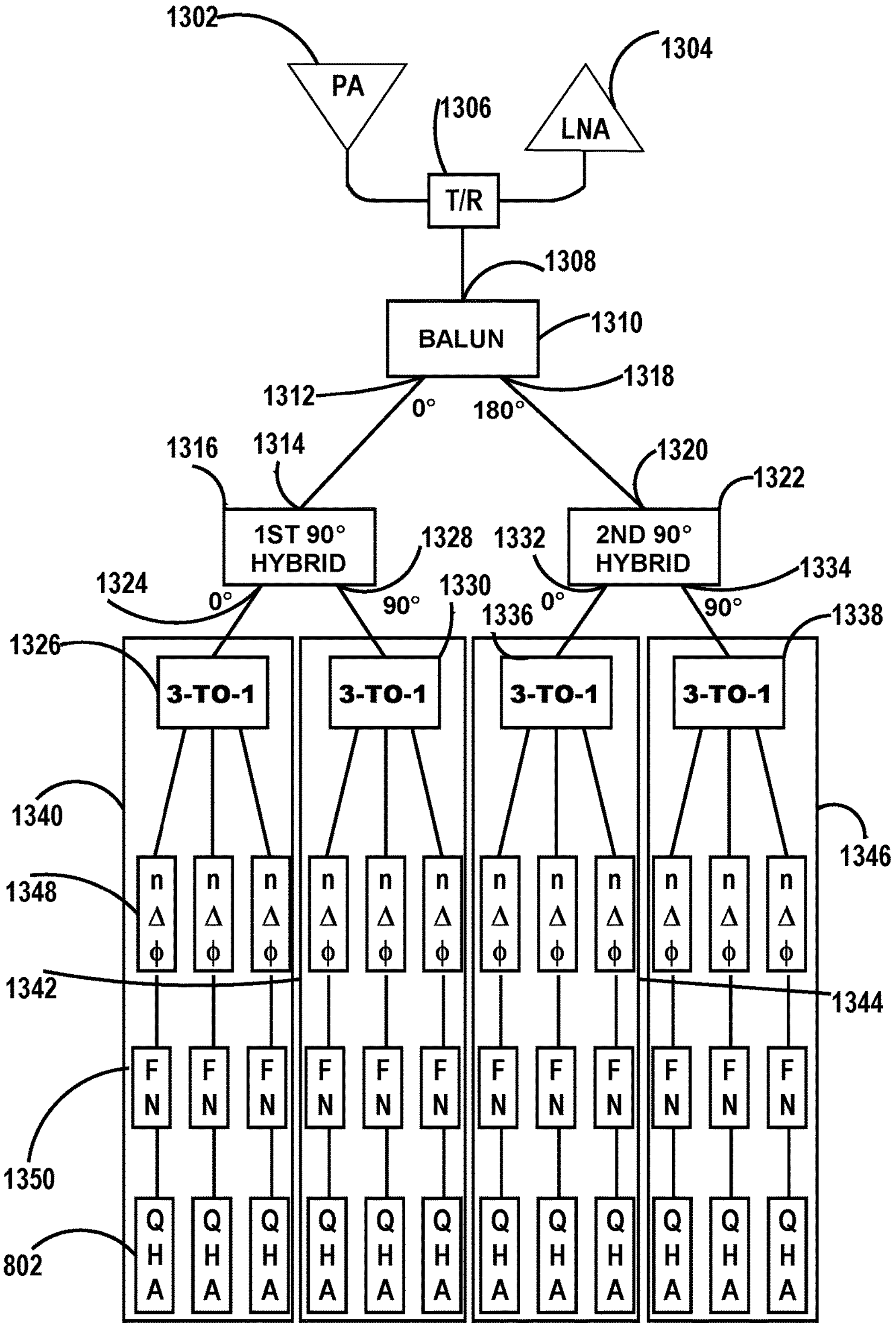
FIG. 13. is a schematic of a signal distribution and signal combining network for phased array antenna shown in FIG. 8.

FIG. 13. is a schematic of a signal distribution and signal combining network 1300 for the phased array antenna shown in FIG. 8. Referring to FIG. 13 a power amplifier 1302 for transmitting signals and a low noise amplifier 1304 for receiving signals are coupled through a transmit-receive switch (T/R) 1306 to an unbalanced port 1308 of a balun 1310. The balun 1310 has a 0° port 1312 coupled to an input port 1314 of a first 90° hybrid 1316. The balun 1310 has a 180° port 1318 coupled to an input port 1320 of a second 90° hybrid 1322. The first 90° hybrid 1316 has a first direct (0°) port 1324 coupled to a first 3-to-1 splitter 1326 and a first coupled (90°) port 1328 coupled to a second 3-to-1 splitter 1330. Similarly the second 90° hybrid 1322 has a second direct (0°) port 1332 coupled to a third 3-to-1 splitter 1336 and a second coupled (90°) port 1334 coupled to a fourth 3-to-1 splitter 1338. The first 1326, second 1330 third 1336 and fourth 1338 3-to-1 splitters are respectively parts of a first circuit subsection 1340, a second circuit subsection 1342, a third circuit subsection 1344, and a fourth circuit subsection 1346 which respectively serve the first group 1202, the second group 1204, the third group 1206 and the fourth group 1208 of QHA elements 802 shown in FIG. 12. There are 12 digitally controlled phase shift networks 1348 (only one of which is labeled to avoid crowding the drawing), three of which are included in each circuit subsection 1340, 1342, 1344, 1346 and three of which are connected to the 3-to-1 splitter 1326, 1330, 1334, 1338 for the respective subsection 1340, 1342, 1344, 1346. Each digitally controlled phase shift network 1348 is coupled to through an associated QHA feed network 1350 (only one of which is labeled to avoid crowding the drawing) to a respective QHA 802. Details of a representative QHA feed network 1350 are shown in FIG. 14 which is discussed below.

As a result of using the balun 1310, the first 90° hybrid 1316, and the second 90° hybrid 1322, the four circuit subsections 1340, 1342, 1344, 1346 are phased at 0°, 90°, 180° and 270°. This phasing compensates for the physical relative orientations of the four circuit subsections 1340, 1342, 1344, 1346.

Figure 14:
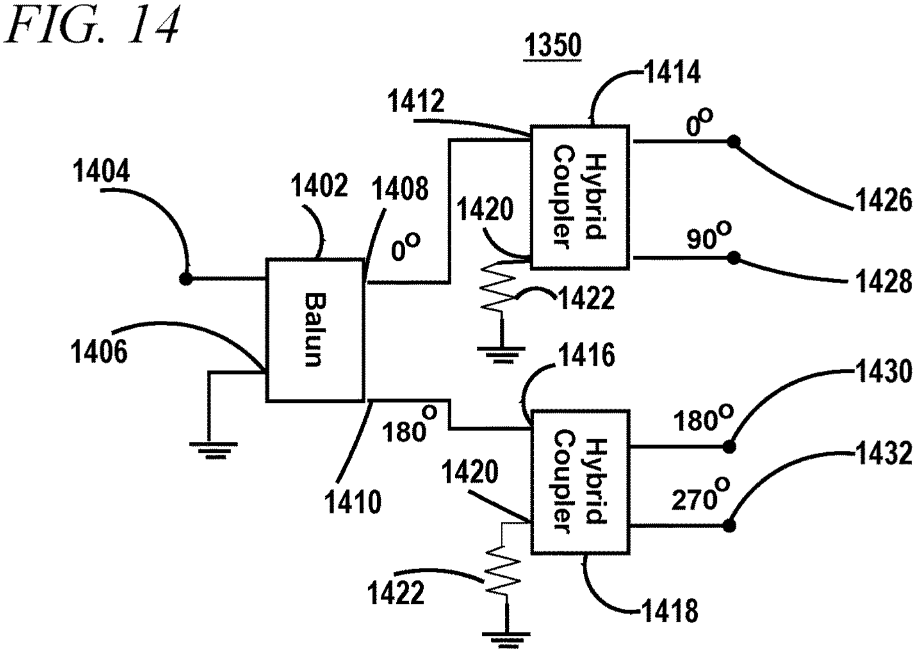
FIG. 14 is a schematic of a QHA feed network used in the signal distribution and combining network shown in FIG. 13.

FIG. 14 is a schematic of a QHA feed network 1350 used in the signal distribution and combining 1300 network shown in FIG. 13. Referring to FIG. 14 a balun 1402 comprises an unbalanced input 1404, an associated input side ground terminal 1406, and a first balanced output 1408 and a second balanced output 1410 having respectively phases of 0° and 180°. The first (0°) balanced output 1408 is coupled to an input 1412 of a first 90° hybrid 1414 and the second (180°) balanced output 1410 is coupled to an input 1416 of a second 90° hybrid 1418. Each of the 90° hybrids 1414, 1418 includes an isolated port 1420 coupled to one of two terminating resistors 1422. The first 90° hybrid 1414 includes a 0° direct output port 1426 and a 90° coupled output port 1428. Similarly the second 90° hybrid 1418, due to the fact that its own input is shifted by 180° by the balun 1402 includes 180° direct output port 1430 and a 270° coupled output port 1432. The four output ports 1426, 1428, 1430, 1432 of the two 90° hybrids are coupled to the four helical filaments 702, 704, 706, 708 (see FIG. 7) of the QHA 700, 802 Note that the phases, 0°, 90°, 180°, 270° are applied in order going in a circle from element to element 702, 704, 706, 708. In this way the QHA 700, 802 is provided with the appropriately phased signals to operate in circularly polarized mode. It is worth mentioning that what is referred to as an "input" above will serve as an "output" when the phased array antenna 800 is operating in receive mode.

Figure 15:
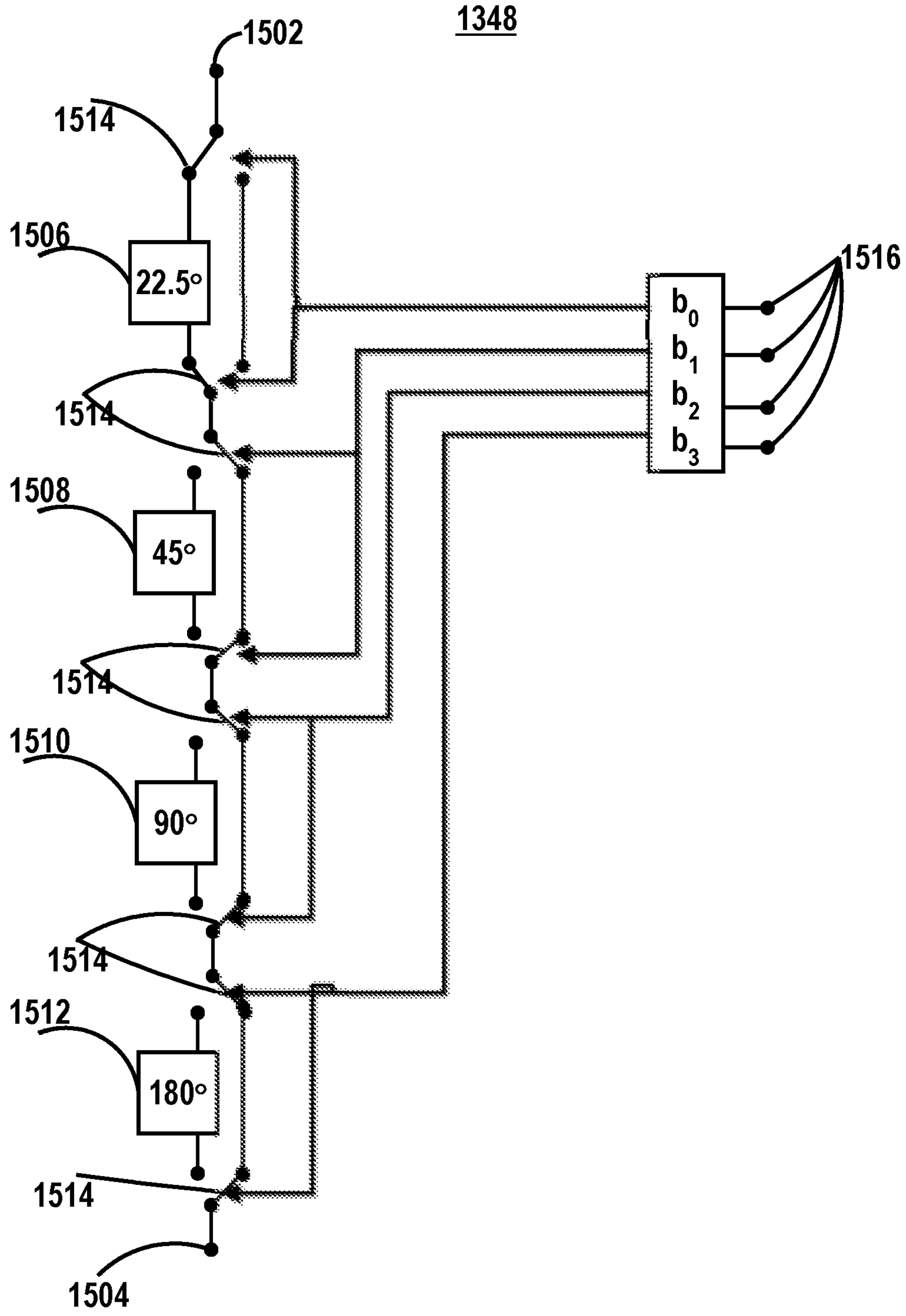
FIG. 15 is a schematic of a discrete phase shifter used in the signal distribution and combining network shown in FIG. 13.

FIG. 15 is a schematic of a digitally controlled discrete phase shifter 1348 used in the signal distribution and combining network 1300 shown in FIG. 13. Between an input terminal 1502 and an output terminal 1504 there are four phase delay elements including a 22.5° phase delay 1506, a 45° phase delay 1508, a 90° phase delay 1510 and a 180° phase delay 1512. The phase delays 1506, 1508, 1510, 1512 can, for example, be implemented as lengths of transmission line. The phase delays 1506, 1508, 1510, 1512 can be selectively bypassed by selective actuation of a plurality of digitally controlled switches 1514. The switches 1514 are controlled by a binary number expression of a desired phase shift that is applied to a binary input 1516 that are coupled to the switches 1514. Thus a least significant bit $b_0$ controls bypassing of the smallest 22.5° phase delay 1506 and a most significant bit b3 controls bypassing of the largest 180° phase delay 1512, and so on.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 16:
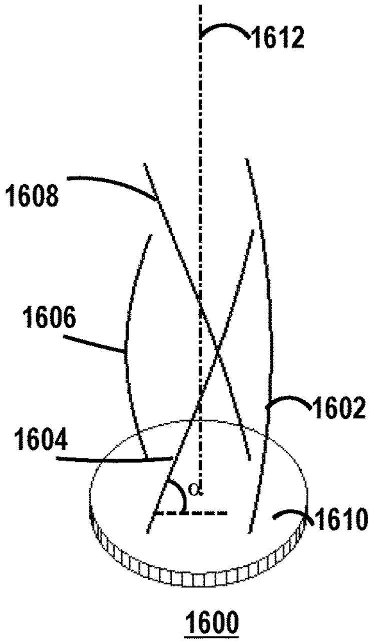
FIG. 16 is front view of a quadrifilar helical antenna (QHA) for use in an earth terminal phased array antenna according to an alternative embodiment of the invention.

FIG. 16 is front view of a quadrifilar helical antenna (QHA) 1600 for use in an earth terminal phased array antenna according to an alternative embodiment of the invention. The QHA 1600 includes a set of four helical filaments including a first helical filament 1602, a second helical filament 1604, a third helical filament 1606 and a fourth helical filament 1608 connected to a printed circuit board 1610. The helical filaments 702, 704, 706, 708 wind about a virtual central axis 1612 of the QHA. The helical filaments 702, 704, 706, 708 may be formed on a piece of flex circuit (not shown) that is formed into cylinder or on a cylindrical surface of a dielectric cylinder. Each of the helical filaments 1602, 1604, 1606, 1608 completes between 0.22 and 0.3 turns (e.g., 0.26 turns according to an exemplary embodiment) around the virtual central axis 1612 of the QHA 1600 and each of the helical filaments 1602, 1604, 1606, 1608 has a length between 0.2125λ and 0.2875λ, (e.g., 0.25λ according to an exemplary embodiment) λ being the wavelength corresponding to the center frequency of operation of the QHA 1600. Furthermore, to achieve the foregoing objectives, according to certain embodiments a virtual cylindrical surface on which the helical filaments 1602, 1604, 1606, 1608 are positioned has a diameter between 12.92 mm and 17.48 mm (e.g., 15.2 mm according to an exemplary embodiment) and the helical filaments 1602, 1604, 1606, 1608 are characterized by a helical pitch angle α of between 62° and 84° (e.g., 73.3° according to an exemplary embodiment). Additional design aspects involved in the forgoing objectives related to form of the gain pattern have to do with the design of the array shown in FIG. 17 and discussed below.

Figure 17:
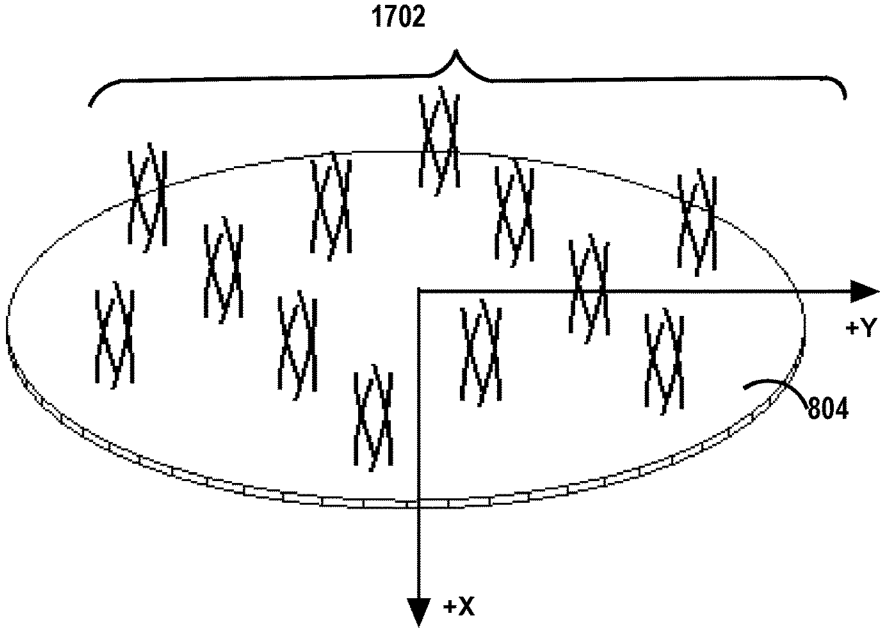
FIG. 17 is a perspective view of an earth terminal phased array antenna that includes 12 of the QHAs shown in FIG. 16 according to alternative embodiment of the invention.

FIG. 17 is a perspective view of an earth terminal phased array antenna 1700 that includes 12 of the QHAs 1600 shown in FIG. 16 according to another embodiment of the invention. The phased array antenna 1700 includes a set 1702 of 12 of the QHAs 1600 shown in FIG. 16. The discussion above concerning the arrangement of the QHA's 802 of the phased array antenna 800 also applies to the QHAs 1702 of the phased array antenna 1700.

According to alternative embodiments a thirteenth QHA is added to the center of the phased array antennas 800, 1700. According to further alternatives a number of QHA's different than 12 and 13 is provided in phased array antennas for use in the systems described herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A phased array antenna for use in an earth terminal of a Low Earth Orbit (LEO) satellite communication system, the phased array antenna comprising:

a set of antenna elements, each antenna element being a quadrifilar helical antenna;

the antenna elements being located on a plane and spaced from each other by a distance of from 0.4λ to 0.45λ, where λ is a wavelength corresponding to an operating frequency of the phased array antenna;

each antenna element comprising a set of four filaments including a first filament, a second filament, a third filament and a fourth filament which wind in helical fashion about an element centerline and each filament having a helical pitch angle α of between 62° and 84°.

2. The phased array antenna for use in the LEO satellite communication system according to claim 1 wherein each of the first filament, second filament, third filament and fourth filament has a length between 0.7λ and 0.8λ, and each filament completes between 0.5 and 0.75 turns about the element centerline.

3. The phased array antenna for use in the LEO satellite communication system according to claim 1 wherein each of the first filament, second filament, third filament and fourth filament has a length between 0.2125λ, and 0.2875λ, and each filament completes between 0.22 and 0.3 turns about the element centerline.

4. The phased array antenna for use in the LEO satellite communication system according to claim 1 wherein each element is provided with a feed network that includes:

a balun having a first balun terminal, a second balun terminal and third balun terminal wherein the first balun terminal serves as an input and an output of the element;

a first 90° hybrid and a second 90° hybrid, wherein each 90° hybrid includes a first hybrid port, a second hybrid port, a third hybrid port and a fourth hybrid port, wherein the first hybrid port of the first 90° hybrid is coupled to the second balun terminal, the first hybrid port of the second 90° hybrid is coupled to the third balun terminal, the second hybrid port of the first 90° hybrid is coupled to the first filament;

the third hybrid port of the first 90° hybrid is coupled to the second filament;

the second hybrid port of the second 90° hybrid is coupled to the third filament; and the third hybrid port of the second 90° hybrid is coupled to the fourth filament.

5. The phased array antenna for use in the LEO satellite communication system according to claim 4 wherein:

the fourth hybrid port of the first 90° hybrid is coupled to ground; the fourth hybrid port of the second 90° hybrid is coupled to ground.

6. The phased array antenna for use in the LEO satellite communication system according to claim 5 wherein:

the fourth hybrid port of the first 90° hybrid is coupled to ground through a first terminating resistor; and the fourth hybrid port of the second 90° hybrid is coupled to ground through a second terminating resistor.

7. The phased array antenna for use in the LEO satellite communication system according to claim 1 wherein:

the set of antenna elements comprises a first group of antenna elements, a second group of antenna elements, a third group of antenna elements and a fourth group of antenna elements, and the phased array antenna further comprises a signal distribution and combining network comprising:

a balun, including an unbalanced side port, a 0° balanced port a 180° balanced port;

a first 90° hybrid including: an input port that is coupled to the 0° balanced port of the balun, a first 0° direct port coupled to the first group of antenna elements, and a first 90° coupled port coupled to the second group of antenna elements;

a second 90° hybrid including: an input port that is coupled to the 180° balanced port of the balun, a second 0° direct port coupled to third group of antenna elements, and a second 90° coupled port coupled to the fourth group of antenna elements.

8. The phased array antenna according to claim 7 wherein:

the first 0° direct port is coupled to multiple individual antenna elements of the first group of antenna elements through a first splitter;

the first 90° coupled port is coupled to the second group of antenna elements through a second splitter;

the second 0° direct port is coupled to multiple individual antenna elements of third group of antenna elements through a third splitter; and the second 90° coupled port is coupled to the fourth group of antenna elements through a fourth splitter.

9. A satellite communication system comprising:

an earth terminal including the phased array antenna according to claim 1; and a satellite in low earth orbit, said satellite having an antenna having a first antenna gain pattern, wherein a distance to the satellite as a function of a zenith angle measured at the earth terminal, and the first antenna gain pattern averaged over azimuth angle and as a function of the zenith angle measured at the earth terminal is such that an infrastructure gain which combines the first antenna gain pattern averaged over azimuth angle and spreading losses associated with distance to the satellite together as a function of the zenith angle measured at the earth terminal has a variation which exhibits a first peak at a first value of the zenith angle measured at the earth terminal;

wherein each antenna element of the earth terminal phased array antenna exhibits a second gain pattern as a function of the zenith angle measured at the earth terminal which has second peak at a second value of the zenith angle measured at the earth terminal that is greater than the first value of the zenith angle measured at the earth terminal.

10. The satellite communication system according to claim 9 wherein the satellite in low earth orbit is at an orbital altitude between 663 km and 897 km.

11. The phased array antenna according to claim 1 wherein the set of elements includes 12 elements.

* * * * *